(12) United States Patent
Lee

(10) Patent No.: US 12,679,307 B2
(45) Date of Patent: Jul. 14, 2026

(54) SENSOR CLEANING APPARATUS

(71) Applicants: Hyundai Motor Company, Seoul (KR); Kia Corporation, Seoul (KR)

(72) Inventor: Jong Geon Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 877 days.

(21) Appl. No.: 17/970,663

(22) Filed: Oct. 21, 2022

(65) Prior Publication Data

US 2023/0303036 A1 Sep. 28, 2023

(30) Foreign Application Priority Data

Mar. 28, 2022 (KR) ........................ 10-2022-0038257

(51) Int. Cl.
| | |
|---|---|
| *B60S 1/54* | (2006.01) |
| *B60S 1/08* | (2006.01) |
| *B60S 1/56* | (2006.01) |
| *F04B 39/06* | (2006.01) |

(52) U.S. Cl.
CPC . *B60S 1/54* (2013.01); *B60S 1/56* (2013.01); *B08B 2203/0235* (2013.01); *B60S 1/0822* (2013.01); *B60S 1/0848* (2013.01); *F04B 39/064* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,480,967 | A | * | 11/1984 | Schulze ................ F04C 11/008 |
| | | | | 417/370 |
| 2007/0212232 | A1 | | 9/2007 | De Larminat |
| 2011/0135519 | A1* | | 6/2011 | Cho ........................ F04D 17/10 |
| | | | | 417/423.7 |
| 2012/0171052 | A1 | | 7/2012 | Giachetti |
| 2013/0064643 | A1 | | 3/2013 | Vos et al. |
| 2013/0220123 | A1* | | 8/2013 | England .................. C02F 3/006 |
| | | | | 95/271 |
| 2014/0037425 | A1* | | 2/2014 | White ................. F04B 39/0027 |
| | | | | 415/119 |

(Continued)

FOREIGN PATENT DOCUMENTS

| | | |
|---|---|---|
| CN | 102562518 A | 7/2012 |
| CN | 112594171 A | 4/2021 |

(Continued)

OTHER PUBLICATIONS

Dated Jan. 24, 2026. Notification of First Office Action, Chinese Patent Application No. 2022114461258. Hyundai Motor Company et al. with Eng Translation.

*Primary Examiner* — Binh Q Tran
(74) *Attorney, Agent, or Firm* — Banner & Witcoff, Ltd.

(57) ABSTRACT
A sensor cleaning apparatus includes an air compressor for compressing air, a compressor distributor connected to the air compressor, a nozzle connected to the compressor distributor for providing air to a sensor, and a control unit connected to at least one of the air compressor or the compressor distributor. The air compressor includes a housing that forms an internal space in which air may be compressed, and a cooling member provided on an external surface of the housing and connected to the compressor distributor.

20 Claims, 3 Drawing Sheets

(56)     References Cited

U.S. PATENT DOCUMENTS

| | | | |
|---|---|---|---|
| 2015/0322997 A1* | 11/2015 | Hritz | F04B 35/01 |
| | | | 417/374 |
| 2016/0138578 A1* | 5/2016 | White | F04B 35/04 |
| | | | 417/63 |
| 2020/0361421 A1 | 11/2020 | Grether et al. | |
| 2021/0190056 A1 | 6/2021 | Brown et al. | |
| 2022/0016563 A1* | 1/2022 | Valentine | F04D 25/084 |
| 2023/0104642 A1 | 4/2023 | Cohrs et al. | |
| 2023/0122679 A1* | 4/2023 | Reuter | F04B 41/02 |

FOREIGN PATENT DOCUMENTS

| | | | |
|---|---|---|---|
| CN | 113007065 A | 6/2021 |
| DE | 102020119473 A1 | 7/2020 |
| KR | 102270357 B1 | 6/2021 |

* cited by examiner

SENSOR CLEANING APPARATUS

CROSS-REFERENCE TO RELATED APPLICATION(S)

This application claims benefit of priority to Korean Patent Application No. 10-2022-0038257 filed on Mar. 28, 2022 in the Korean Intellectual Property Office, the disclosure of which is incorporated herein by reference in its entirety.

BACKGROUND

Foreign objects attached to a sensor may generate noise and make it difficult to obtain accurate data. This may detrimentally affect any processes that use data from the sensor, such as automated processes of a vehicle (e.g., autonomous driving).

To eliminate noise caused by foreign objects, a sensor cleaning apparatus may be used for periodically cleaning the sensor. However, an air compressor provided in a sensor cleaning apparatus may overheat over time, resulting in reduced efficiency. In a case in which the air compressor is severely overheated, the operation of the air compressor may stop.

If sensor cleaning is performed infrequently and/or for a short period of time, the air compressor may not be heavily loaded and overheating may not occur. However, when sensor cleaning is performed sufficiently (e.g., continuously and/or for a long period of time, such as due to rain, snowfall, or the like), the air compressor may become heavily loaded and overheat, leading to reduced efficiency in, or stopping of, the operation of the air compressor.

Adding an additional mechanical and/or electronic apparatus to a vehicle may introduce various problems, such as complications to layout, an increase in vehicle weight, an increase in manufacturing costs, and an increase in power consumption.

SUMMARY

The following summary presents a simplified summary of certain features. The summary is not an extensive overview and is not intended to identify key or critical elements.

Systems, apparatuses, and methods are described for cleaning a sensor. An apparatus may comprise an air compressor configured to compress air, a compressor distributor connected to the air compressor, and a control unit connected to at least one of the air compressor or the compressor distributor. The air compressor may comprise a housing forming an internal space for compressing air and a cooling member proximal to a surface of the housing and connected to the compressor distributor. The cooling member may comprise one or more inlet ports configured to receive air from the compressor distributor, a body configured to receive air through the one or more inlet ports, and one or more outlet ports configured to discharge air from the body.

Also, or alternatively, the apparatus may comprise comprising an air compressor comprising a housing that forms an internal space, a cooling member provided on a surface of the housing, a compressor distributor connected to the air compressor, a nozzle connected to the compressor distributor; and a control unit connected to at least one of the air compressor or the compressor distributor. The compressor distributor may be configured to provide air received from the internal space of the housing to at least one of the nozzle or the cooling member.

These and other features and advantages are described in greater detail below.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
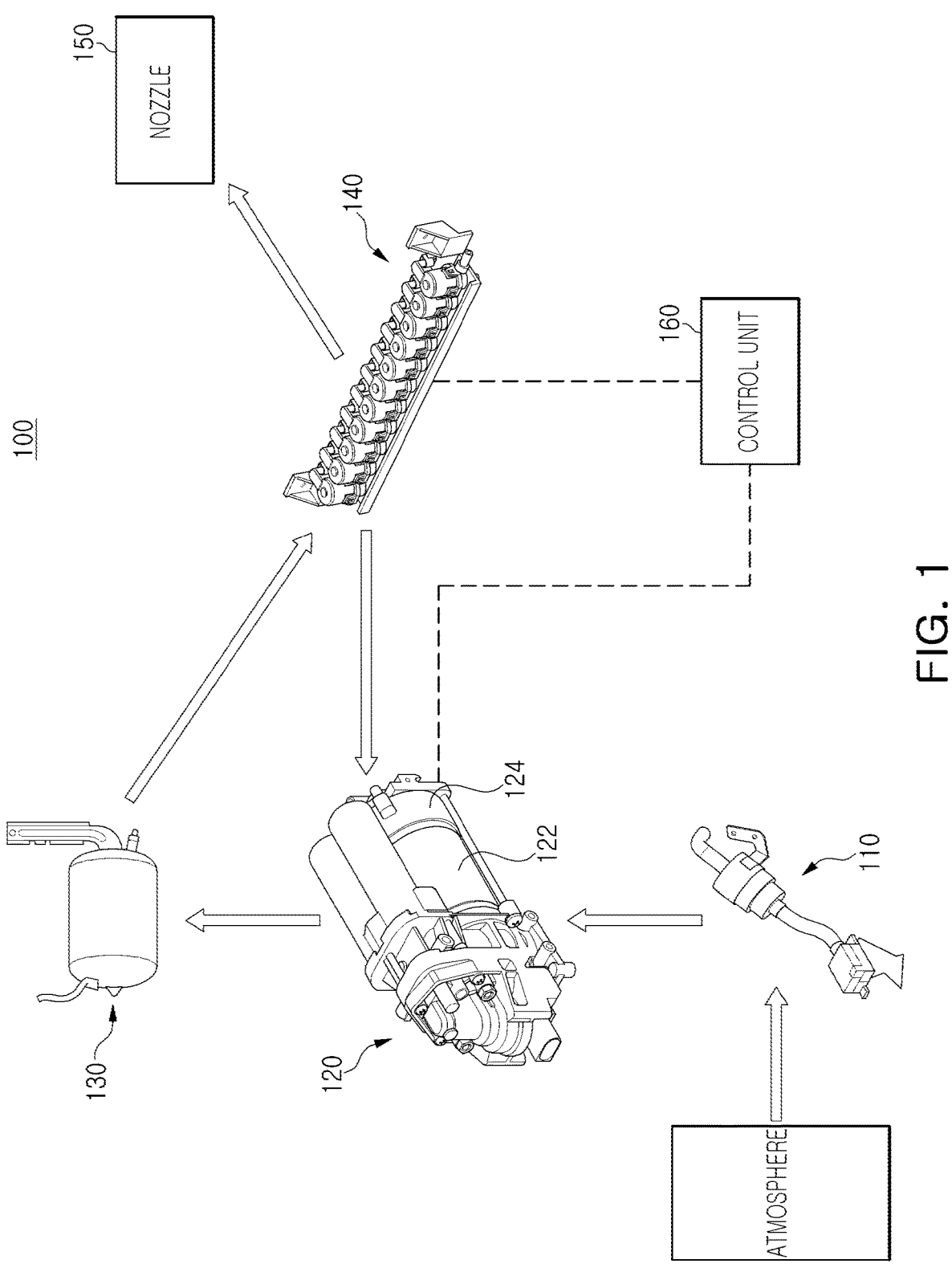
FIG. 1 is a configuration diagram illustrating example components of a sensor cleaning apparatus according to the present disclosure.

Terms or words used in the present specification and claims are not to be restrictively construed as having their general or dictionary meanings, and are to be construed as having meanings consistent with the technical spirit of the present disclosure. The exemplary examples described in the present specification and the configurations illustrated in the drawings are merely the exemplary examples of the present disclosure, not representing all of the technical spirit of the present disclosure. Therefore, it should be understood that the scope of the present disclosure comprises various equivalents and modifications that may be made thereto.

Hereinafter, exemplary examples of the present disclosure will be described with reference to the accompanying drawings. However, the example of the present disclosure may be modified to have various other forms, and the scope of the present disclosure is not limited to the exemplary examples described below. The exemplary examples of the present disclosure are provided to more completely explain the present disclosure to one having ordinary knowledge in the art. In the drawings, the shapes and dimensions of elements may be exaggerated for clarity.

In addition, in the present specification, singular expressions comprise plural expressions unless the context clearly indicates otherwise, and the same reference signs denote the same or corresponding elements throughout the specification.

In addition, in the present specification, the expressions "upper side", "upper portion", "lower side", "lower portion", "side surface", "front surface", "rear surface", and the like are used based on directions shown in the drawings, and may be differently expressed when the directions of the relevant elements are changed.

FIG. 1 is a configuration diagram illustrating a sensor cleaning apparatus according to an example of the present disclosure. A sensor cleaning apparatus 100 may comprise an air filter 110, an air compressor 120, a reservoir tank 130, a compressor distributor 140, a nozzle 150, and a control unit 160. The sensor cleaning apparatus 100 may be installed, or configured to be installed, in a vehicle, e.g., an autonomous vehicle. The air filter 110 may be configured to remove foreign objects in air being introduced into the air compressor 120. The air filter 110 may be installed, for example, in a flow pipe (not shown) through which air is supplied into the air compressor 120.

The air compressor 120 may be configured to receive air from the air filter 110. The air compressor 120 may be capable of compressing air (e.g., received from the air filter 110). The air compressor 120 may be configured to discharge compressed air inside the air compressor 120 outside the air compressor 120. A motor driving unit (not shown) may be provided in the air compressor 120. The motor driving unit may be installed inside a housing 122 of the air compressor. The control unit 160 may be connected to the air compressor 120, and may be configured to control the motor driving unit in the air compressor 120.

The housing 122 may form an internal space for compressing the air. A cooling member 124 may be configured to cool a portion of the housing 122. For example, the cooling member 124 may be provided on an external surface of the housing 122. The cooling member 124 may be connected to the compressor distributor 140. The cooling member 124 may be capable of dissipating heat from the housing 122, such that the cooling member 124 may serve to prevent the housing 122 from becoming overheated.

The housing 122 may comprise an air supply port configured to introduce air, such as air having passed through the air filter 110, to the housing 122. The housing 122 may comprise an outlet port (not shown) configured to discharge air from within the housing 122 (e.g., air that has been compressed). For example, the motor driving unit may be configured to, when driven, cause air, introduced via the supply port into the internal space formed by the housing 122, to be compressed. Compressed air within the internal space formed by the housing 12 may be discharged through the outlet port.

The cooling member 124 may be disposed at an end portion of the housing 122. Also, or alternatively, the cooling member 124 may be connected to the compressor distributor 140 through a connecting pipe (not shown). Some of the compressed air supplied from the air compressor 120 (e.g., via the reservoir tank 130) to the compressor distributor 140 may be supplied to the cooling member 124.

Compressed air supplied to the cooling member 124 may be able to expand in an internal space of the cooling member 124, and a temperature of the air supplied to the cooling member may decrease while flowing through the internal space of the cooling member 124. The cooling member 124 may be able to may exchange heat with the housing 122 (e.g., due to expanding air in the internal space decreasing in temperature and/or through thermal conductive materials of the cooling member 124 and/or the housing 122 and/or a thermal conductive connection between the cooling member 124 and the housing 122), thereby decreasing a temperature of the air compressor 120.

Air may be discharged to outside of the cooling member 124. This may contribute to the expansion of the compressed air introduced into the cooling member 124, which may be sufficient to allow for a temperature of the compressed air to decrease in the cooling member 124.

The reservoir tank 130 may be connected to the air compressor 120, and may be configured to store air compressed by the air compressor 120. The reservoir tank 130 may have an internal space to store the compressed air. The reservoir tank 130 may be disposed between the air compressor 120 and the compressor distributor 140. Air compressed by the air compressor 120 may be stored in the reservoir tank 130, which may be able to then supply the stored compressed air to the compressor distributor 140.

The compressor distributor 140 may be connected to the reservoir tank 130, and may be configured to distribute and/or supply the compressed air stored in the reservoir tank 130 to the nozzle 150. The compressor distributor 140 may comprise a plurality of slots. Some of the plurality of slots may be configured to supply compressed air to the nozzle 150, and other of the slots may be configured to supply the compressed air to the cooling member 124. The compressor distributor 140 may be connected to the control unit 160. The control unit 160 may be configured to control the compressor distributor 140 to provide compressed air to the nozzle 150 and/or to the cooling member 124. The control unit 160 may control the compressor distributor 140 to supply the compressed air to both the nozzle 150 and the cooling member 124 simultaneously, and/or to supply the compressed air to only one of the nozzle 150 or the cooling member 124.

The nozzle 150 may be configured to be disposed, and/or configurably disposed, to be able to direct compressed air towards a sensor (not shown), for example a sensor provided in a vehicle in which the sensor cleaning apparatus 100 may be installed. The nozzle may be configured to direct compressed air towards the sensor which may be capable of removing foreign objects on to the sensor. The control unit 160 may control the compressed air to be periodically discharged from the nozzle 150 to clean the sensor, and/or when a foreign object (e.g., dust, dirt, etc.) is detected on the sensor and/or function of the sensor is compromised.

The control unit 160 may be connected to the air compressor 120 and/or the compressor distributor 140. The control unit 160 may be capable of controlling distribution of the compressed air from the compressor distributor 140 to the nozzle 150 and/or the cooling member 124 of the air compressor 120. Also, or alternatively, the control unit 160 may serve to control an operation of the air compressor 120 (e.g., based on an amount of the compressed air stored in the reservoir tank 130).

Figure 2:
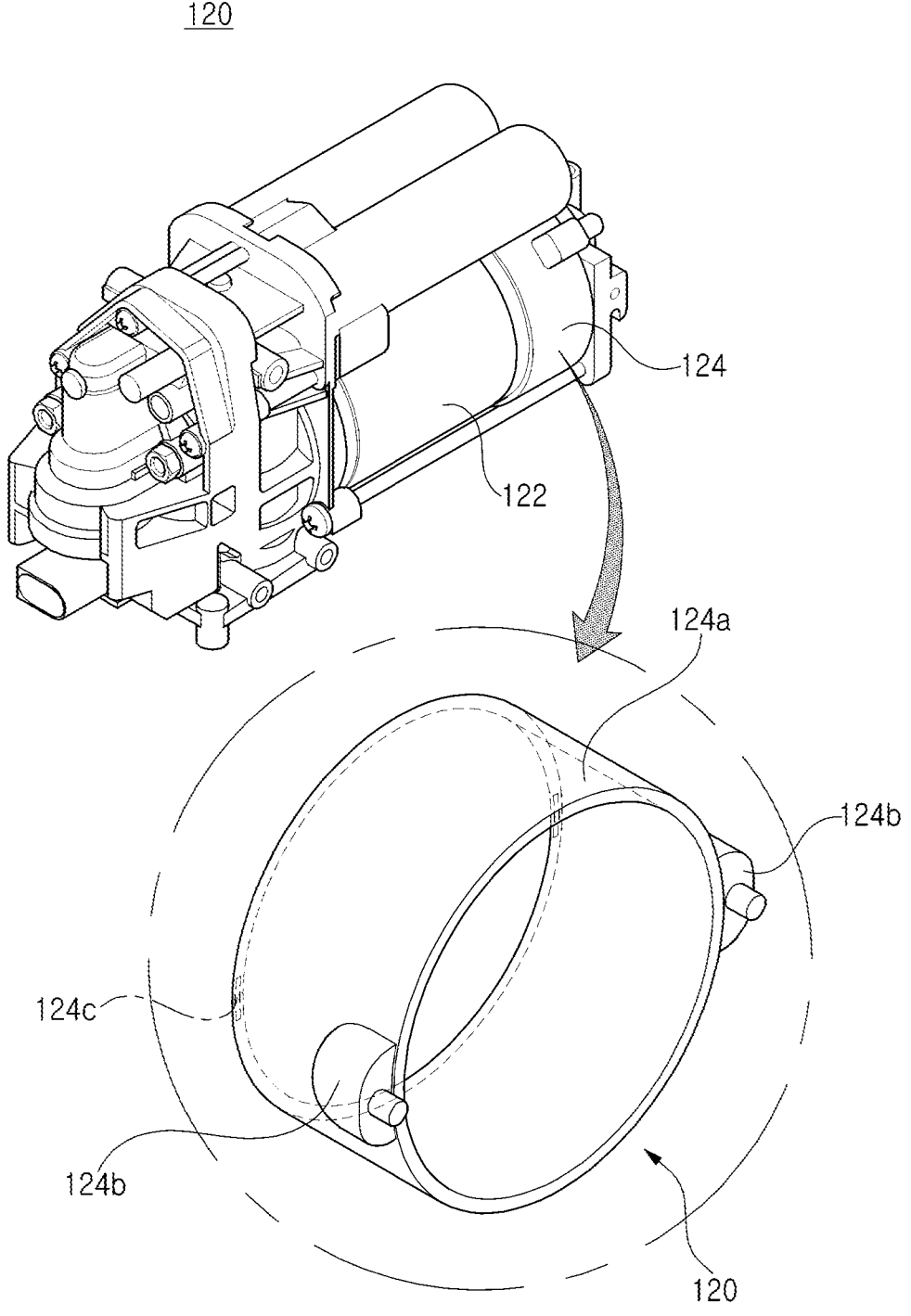
FIG. 2 is a perspective view illustrating an example air compressor of the sensor cleaning apparatus according to the present disclosure.
Figure 3:
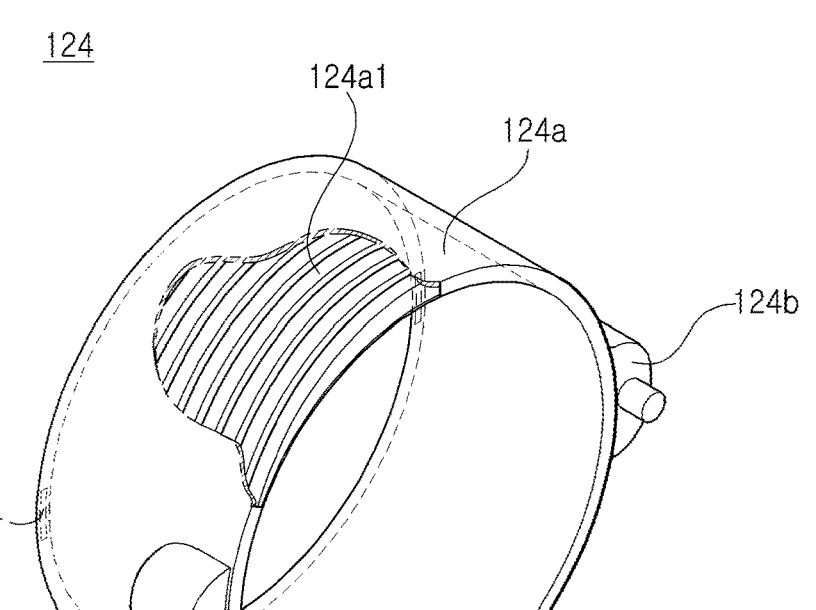
FIG. 3 is a partially cut-away perspective view illustrating a cooling member of the sensor cleaning apparatus according to an example of the present disclosure.

FIG. 2 is a perspective view illustrating an air compressor of the sensor cleaning apparatus according to an example of the present disclosure, and FIG. 3 is a partially cut-away perspective view illustrating a cooling member of the sensor cleaning apparatus according to an example of the present disclosure Referring to FIGS. 2 and 3, the cooling member 124 may comprise a body 124a forming an internal space in which air may be able to flow, and one or more inlet ports 124b provided in an surface of the body 124a. The inlet ports 124b maybe connected to the compressor distributor 140.

The body 124a may have a shape to conform to the housing 122. For example, the body 124a may comprise an annular shape that may be able to go around the housing 122. In an example, the body 124a may have a circular ring shape. In addition, the body 124a may comprise outlet ports 124c through which the air introduced through the inlet ports 124b may be discharged to the outside. The outlet ports 124c may be provided in a number and in sizes/shapes so as to collectively provide a cross-section (e.g., a collective and/or combined cross-section) for air flow that is equal to or greater than a collective cross-section provided by the inlet ports 124b. For example, a number of the outlet ports may be the same as, or greater than, a number of the inlet ports 124b. The outlet ports 124c may comprise openings formed in the body 124a.

One or more concave-convex portions 124a1 may be provided on an internal surface of the body 124a. The one or more concave-convex portions 124a1 may be disposed to be spaced apart from each other in a width direction of the body 124a, which is an X-axis direction of FIG. 3. The concave-convex portions 124a1 may increase a surface area of the internal surface of the body 124a, which may improve heat exchange efficiency of the body 124a. A height of a convex portion of the one or more concave-convex portions 124a1 may be lower than a height of the internal space of the body 124a, which may allow for air to flow over the convex portion through the internal space of the body 124a. The internal space formed inside the body 124a, in which the compressed air may be able to flow, may have a larger cross-sectional area than the cross-sectional area of the one or more inlet ports 124b. This may facilitate sufficient expansion of compressed air introduced into the body 124a to cause a temperature of decrease, while its volume increases.

Figure 4:
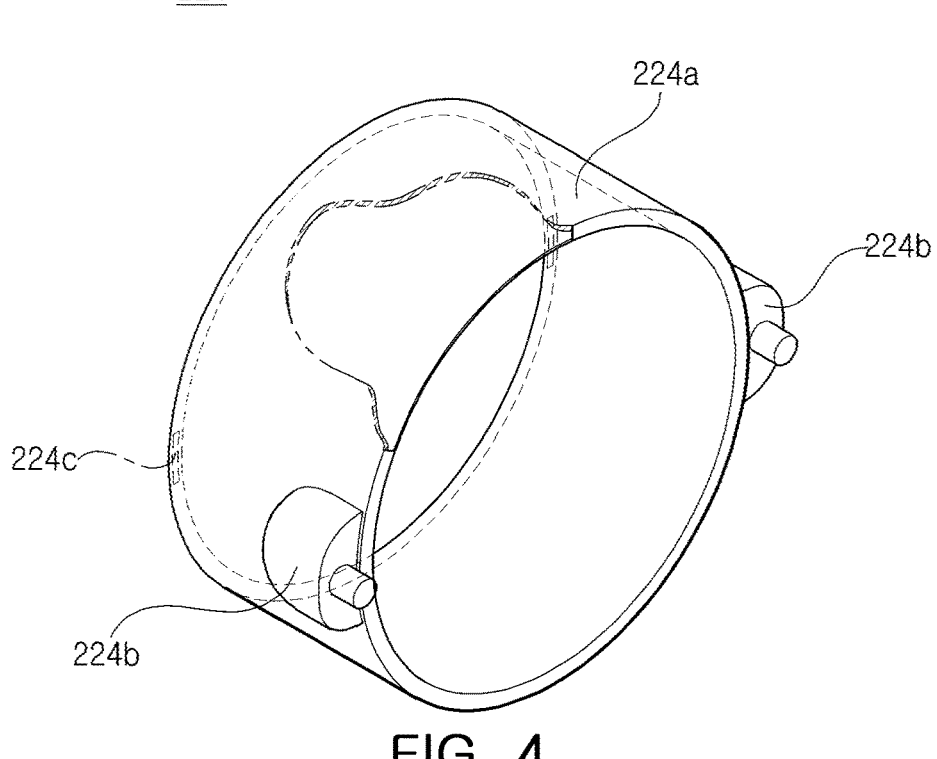
FIG. 4 is a partially cut-away perspective view illustrating a cooling member of the sensor cleaning apparatus according to an example of the present disclosure.

One or more inlet ports 124b may be disposed in the external surface of the body 124a. FIGS. 2-4 show two inlet ports 124b, but the number of inlet ports is not limited thereto, and one, three, or more inlet ports 124b may be provided. The number of inlet ports 124b may be equal to or smaller than the number of outlet ports 124c. Also, or alternatively, a collective cross-sectional area of the inlet ports 124b may be equal to or smaller than a collective cross-sectional area of the outlet ports 124c, wherein the collective cross-sectional area represents a total cross-sectional area of each of the ports and a cross-sectional area of a port represents an area. That is, the inlet ports 124b may provide a same total cross-section through which air may be able to pass than the number of outlet ports 124c, which may allow for compressed air introduced into the inlet ports 124b to expand more smoothly. For example, when the number of outlet ports 124c is smaller than the number of inlet ports 124b, and/or when a cross-sectional area of the outlet ports 124c is smaller than a cross-sectional area of the cross-sectional area of the of the inlet ports 124b, the compressed air may expand less smoothly.

The compressed air supplied from the compressor distributor 140 may be supplied to the body 124a through the inlet ports 124b. The compressed air in the internal space of the body 124a may expand. The expanded air may be discharged to the outside through the outlet ports 124c of the body 124a. The air discharged to the outside through the outlet ports 124c may have a lower temperature than the housing 122. The air discharged from the body 124a may further cause the temperature of the housing 122 to decrease.

As described above, since the compressed air supplied from the compressor distributor 140 expands while flowing through the cooling member 124, it may be possible to improve efficiency in exchanging heat with the housing 122, thereby preventing the air compressor 120 from being overheated. In addition, since the air is discharged to the atmosphere, a separate processing part may be unnecessary.

Hereinafter, it will be described with reference to FIGS. 1 to 3 how the present disclosure works.

The sensor cleaning apparatus 100 may compress air and sprays the compressed air towards a sensor through the nozzle 150. The compressed air may be sprayed towards a sensor with sufficient pressure to remove a foreign object (e.g., dust) attached to the sensor, thereby preventing noise that may have resulted from the foreign object attached to the sensor, which may have made obtaining accurate data from the sensor difficult.

Air may be introduced into the sensor cleaning apparatus 100 from the atmosphere. The air may be filtered to removed impurities (e.g., dust, dirt, etc.) by passing through the air filter 110. The filtered air may flow into the air compressor 120, where it may be compressed. The compressed air may be stored in the reservoir tank 130. The compressed air may be provided to the compressor distributor 140 (from the air compressor 120 and/or from the reservoir tank 130) based on operation of the compressor distributor 140, which may be controlled by the control unit 160.

The control unit 160 may determine that the air compressor 120 should be cooled. Based on such a determination, compressed air may be supplied to the compressor distributor 140. The control unit 160 may control the compressor distributor 140 to supply some of the compressed air supplied to the compressor distributor 140 to the cooling member 124 of the air compressor 120.

The compressed air supplied to the cooling member 124 may be introduced into the body 124a of the cooling member 124 through one or more inlet ports 124b of the cooling member 124. The compressed air introduced into the body 124a of the cooling member may allow air to expand and/or to exchange heat with the housing 122 of the air compressor 120. The concave-convex portions 124a1 provided on the internal surface of the body 124a may improve heat exchange efficiency.

Air from within the body 124a of the cooling member 124 may be discharged outside of the body 124a through one or more discharge ports 124c of the cooling member 124.

In this way, when a temperature of the air compressor 120 increases, the compressed air may be supplied to the cooling member 124 to prevent the air compressor 120 from being overheated.

The cooling member 124 of the air compressor 120 may be capable of providing sufficient cooling, as described above, to prevent the air compressor 120 from being overheated. The cooling member 125 may have a small size and/or be provided as part of the air compressor (e.g., integral with, directly connected to, within). These features may allow the cooling member to be capable of providing cooling without increasing a level of difficulty of layout. The cooling member 124 may be lightweight, which may suppress an increase in weight of a vehicle comprising the air compressor 120, for example, and which may suppress an increase in manufacturing cost.

Because some of the compressed air supplied to the compressor distributor 140 may be supplied to the cooling member 124, it may be possible to use existing control and/or only control operation of the compressor distributor 140, which may suppress an increase in power consumption.

FIG. 4 is a partially cut-away perspective view illustrating a cooling member of the sensor cleaning apparatus according to an example of the present disclosure.

Referring to FIG. 4, the cooling member 224 may comprise a body 224a forming an internal space in which air may be able to flow, and one or more inlet ports 224b provided in an external surface of the body 224a. The inlet ports may be connected to the compressor distributor 140 (see FIG. 1).

The body 224a may have a shape that matches and/or conforms to a shape of the housing 122. For example, the body 224a may have an annular shape, such as a circular ring shape. In addition, the body 224a may comprise one or more outlet ports 224c through which the air introduced through the inlet ports 224b may be discharged to the outside. The one or more outlet ports 224c may be provided in the same number as the inlet ports 224b or in a larger number than the inlet ports 224b, and/or a cross-sectional area of the one or more outlet ports 224c may be larger than or equal to a cross-sectional area of the one or more inlet ports 224b. The outlet ports 224c may form openings in the body 224a. An internal surface of the body 224a may be formed to be flat (e.g., smooth, without substantial roughness or textures, such as convex/concave portions) so that air may flow smoothly through the internal space of the body 224a. For example, there may be no concave-convex portions formed on the internal surface of the body 224a.

One or more inlet ports 224b may be disposed to be spaced apart from each other in the external surface of the body 224a. FIG. 4 illustrates two inlet ports 224b are provided, but the number of inlet ports is not limited thereto, and one or three or more inlet ports 224b may be provided. Also, as described above, the number of inlet ports 224b may be equal to or smaller than the number of outlet ports 224c.

Compressed air may be supplied from the compressor distributor 140 to the body 224a through the inlet ports 224b. The compressed air introduced through the inlet ports 224b to the internal space of the body 224a may be allowed to expand. Thereafter, the air may be discharged to the outside through the outlet ports 224c of the body 224a.

The expansion of the compressed air supplied from the compressor distributor 140 to the cooling member 224 may efficiently exchange heat with the housing 122 (see FIG. 2 and description above), thereby preventing the air compressor 120 comprising and/or associated with the cooling member 224 from being overheated.

The sensor cleaning apparatus of present disclosure, as described above, may allow for operation of the air compressor without overheating.

In addition, the sensor cleaning apparatus of the present disclosure reduces any increases in weight and manufacturing cost.

An aspect of the present disclosure may provide a sensor cleaning apparatus capable of preventing an air compressor from being overheated.

Another aspect of the present disclosure may provide a sensor cleaning apparatus capable of minimizing increases in weight and manufacturing costs.

According to an aspect of the present disclosure, a sensor cleaning apparatus may comprise: an air compressor compressing air introduced thereinto; a compressor distributor connected to the air compressor; a nozzle connected to the compressor distributor to provide the air to a sensor; and a control unit connected to at least one of the air compressor and the compressor distributor, wherein the air compressor comprises: a housing having an internal space for compressing the air; and a cooling member provided on an external surface of the housing and connected to the compressor distributor.

The cooling member may comprise a body in which air flows, and an inlet port provided in the body and connected to the compressor distributor, and the body may comprise an outlet port through which the air expanding while flowing therein is discharged.

A concave-convex portion may be provided inside the body.

A plurality of concave-convex portions may be provided in a width direction of the body.

The plurality of concave-convex portions may be disposed to be spaced apart from each other at the same interval.

The body may have a circular ring shape, and a plurality of inlet ports may be disposed to be spaced apart from each other in an external surface of the body.

A plurality of outlet ports may be disposed opposite to the inlet ports.

The number of outlet ports may be equal to or larger than the number of inlet ports.

The cooling member and the compressor distributor may be connected to each other through a connecting pipe.

The sensor cleaning apparatus according to an aspect of the present disclosure may further comprise a reservoir tank disposed between the air compressor and the compressor distributor.

The sensor cleaning apparatus according to an aspect of the present disclosure may further comprise an air filter disposed for a stage before the air compressor.

The compressor distributor may be connected to the air compressor and the nozzle to supply the supplied compressed air to at least one of the cooling member and the nozzle.

An internal surface of the body may be flat to facilitate the expansion of the compressed air introduced into the body.

According to another aspect of the present disclosure, a sensor cleaning apparatus may comprise: an air compressor comprising a housing having an internal space for compressing air and a cooling member provided on an external surface of the housing; a compressor distributor connected to the air compressor; a nozzle connected to the compressor distributor to provide the air to a sensor; and a control unit connected to at least one of the air compressor and the compressor distributor, wherein the compressor distributor provides the air compressed by the air compressor to at least one of the nozzle and the cooling member, and the air supplied to the cooling member exchanges heat with the housing while expanding in the cooling member.

Although various exemplary examples of the present disclosure have been described in detail above, it will be apparent to those skilled in the art that the scope of the present disclosure is not limited thereto, and modifications and variations may be made without departing from the technical spirit of the present disclosure. In addition, each of the above-described exemplary examples may be implemented with some of the components being removed, and the above-described exemplary examples may be implemented in combination with each other.

What is claimed is:

1. An apparatus, comprising:
an air compressor configured to compress air;
a compressor distributor connected to the air compressor;
a reservoir tank disposed between the air compressor and the compressor distributor; and
a control unit connected to at least one of the air compressor or the compressor distributor,
wherein the air compressor comprises:
a housing forming an internal space for compressing air; and
a cooling member proximal to a surface of the housing and connected to the compressor distributor.

2. The apparatus of claim 1, wherein the cooling member comprises:
one or more inlet ports configured to receive air from the compressor distributor;
a body configured to receive air through the one or more inlet ports; and
one or more outlet ports configured to discharge air from the body.

3. The apparatus of claim 2, wherein the body comprises an internal surface comprising a concave-convex portion.

4. The apparatus of claim 2, wherein the body comprises an internal surface comprising a plurality of concave-convex portions.

5. The apparatus of claim 4, wherein the plurality of concave-convex portions are spaced apart from each other at a same interval.

6. The apparatus of claim 2, wherein the body has a shape that conforms to an outer surface of the housing, wherein the one or more inlet ports are a plurality of inlet ports, and wherein the plurality of inlet ports are spaced apart from each other in a surface of the body.

7. The apparatus of claim 6, wherein the one or more outlet ports are a plurality of outlet ports, and wherein the plurality of outlet ports are located in the surface of the body opposite to the inlet ports.

8. The apparatus of claim 2, wherein a number of the one or more outlet ports is equal to or greater than a number of the one or more inlet ports.

9. The apparatus of claim 1, wherein the cooling member is connected to the compressor distributor via a connecting pipe.

10. The apparatus of claim 1, further comprising an air filter configured to provide filtered air to the air compressor.

11. The apparatus of claim 1, wherein the compressor distributor is configured to supply compressed air from the air compressor to at least one of the cooling member or a nozzle capable of directing air.

12. The apparatus of claim 2, wherein an internal surface of the body is substantially smooth so as be able to facilitate expansion of compressed air introduced into the body.

13. The apparatus of claim 2, wherein a combined cross-section of the one or more outlet ports is equal to or greater than a combined cross-section of the one or more inlet ports.

14. The apparatus of claim 1, further comprising a nozzle connected to the compressor distributor.

15. An apparatus, comprising:

an air compressor comprising a housing forming an internal space;

a cooling member provided on a surface of the housing;

a compressor distributor connected to the air compressor;

a reservoir tank disposed between the air compressor and the compressor distributor;

a nozzle connected to the compressor distributor; and a control unit connected to at least one of the air compressor or the compressor distributor, wherein the compressor distributor is configured to supply compressed air stored in the reservoir tank to at least one of the nozzle or the cooling member.

16. The apparatus of claim 15, wherein the surface of the housing is an external surface of the housing.

17. The apparatus of claim 15, wherein the cooling member is thermally coupled to the housing.

18. The apparatus of claim 1, wherein the compressor distributor is configured to supply compressed air stored in the reservoir tank to the cooling member.

19. The apparatus of claim 1, wherein a temperature of compressed air is decreased by expansion of the compressed air within the cooling member.

20. An apparatus, comprising:

an air compressor configured to compress air;

a compressor distributor connected to the air compressor;

a reservoir tank disposed between the air compressor and the compressor distributor; and control circuitry electrically coupled to at least one of the air compressor or the compressor distributor, wherein the air compressor comprises:

a housing forming an internal space for compressing air; and a cooler proximal to a surface of the housing and connected to the compressor distributor.

* * * * *